E. G. BANNER.
APPARATUS FOR VENTILATING SOIL AND DRAIN PIPES, &c.
No. 187,503. Patented Feb. 20, 1877.
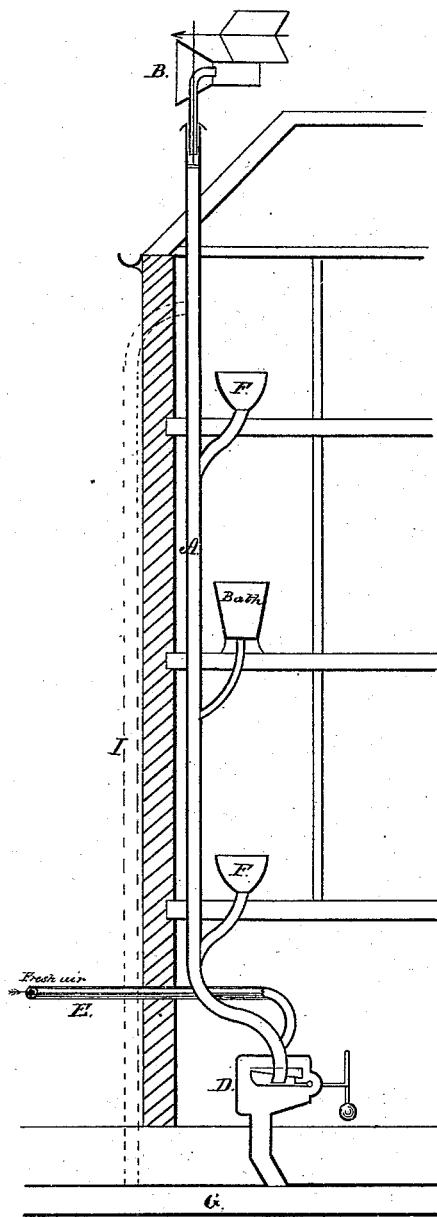
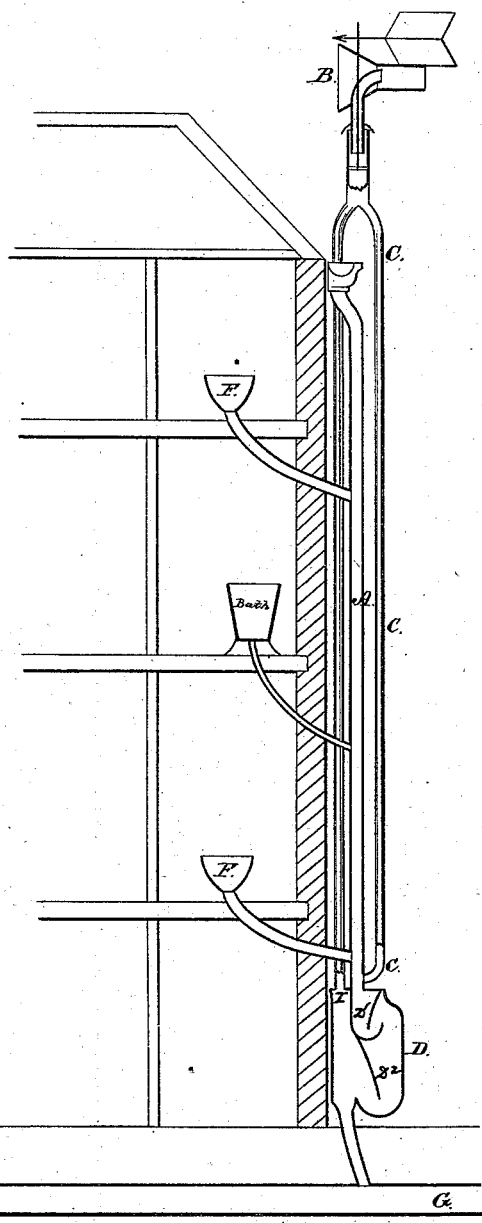

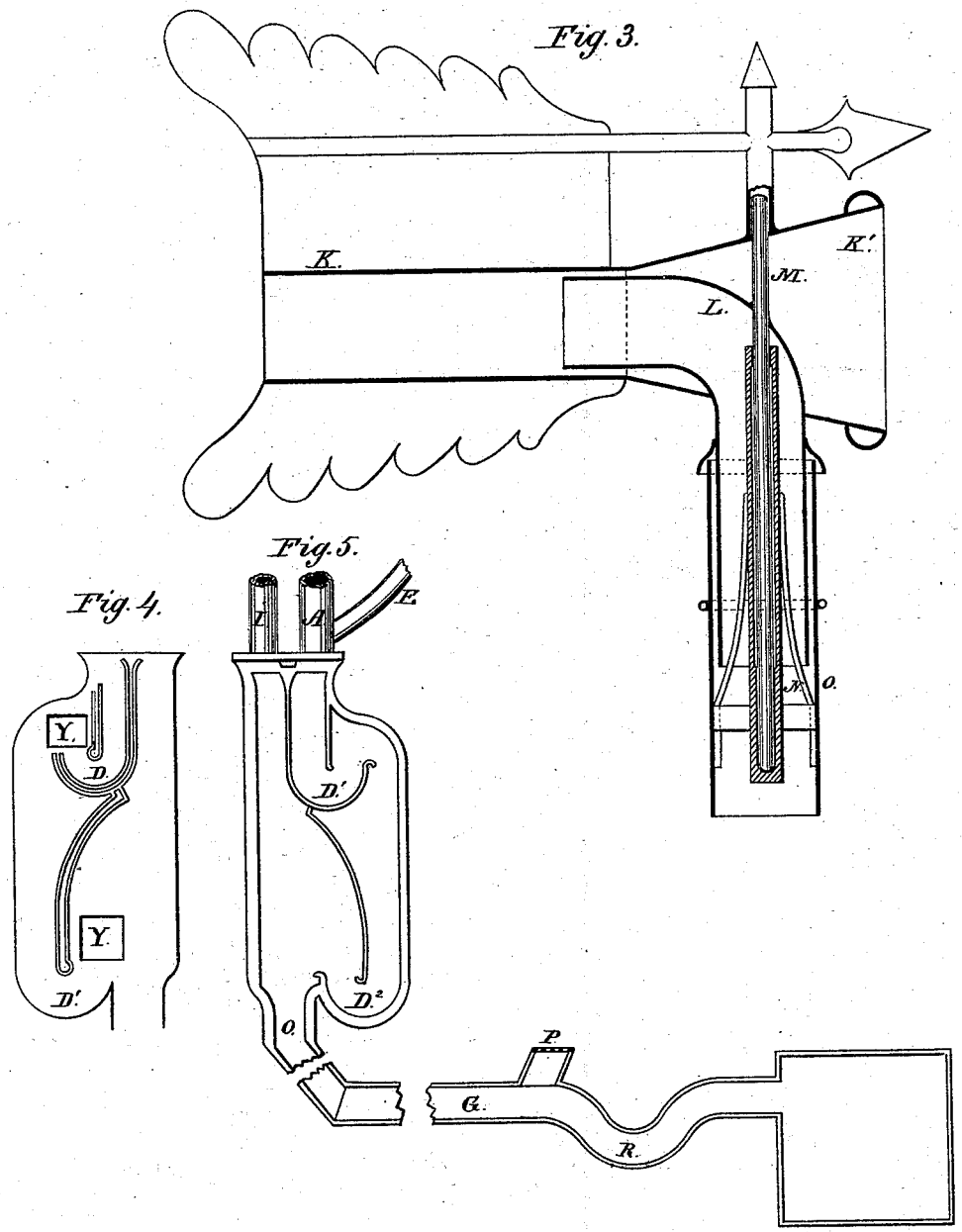

UNITED STATES PATENT OFFICE.

EDWARD G. BANNER, OF LONDON, ENGLAND.

IMPROVEMENT IN APPARATUS FOR VENTILATING SOIL AND DRAIN PIPES, &c.

Specification forming part of Letters Patent No. 187,503, dated February 20, 1877; application filed September 27, 1876.

*To all whom it may concern:*

Be it known that I, EDWARD G. BANNER, of Billiter square, in the city of London, England, have invented a new and Improved Apparatus for Ventilating Soil and Drain Pipes, &c.; and I do hereby declare that the following is a full, clear, and exact description of the same, reference being had to the accompanying drawing, forming part of this specification.

This invention has for its object to prevent the passage of sewage-gas into dwellings from soil-pipes, drains, cess-pools, or sewers. For this purpose I place a trap at the lower end of the soil-pipe, which latter is carried up to the top of the house, and there left open to form an inlet for fresh air; and I connect to the soil-pipe, just above the trap above mentioned, a ventilating-pipe, (which may be of smaller diameter than the soil-pipe,) which I also carry up to the top of the house, and place upon it a ventilating-cowl, so constructed that the passage of wind through it shall produce at all times a continuous current of air from the inlet through the soil-pipe and out at the cowl; or, by a slight modification, I may reverse the direction of the current of air in the soil-pipe by placing the ventilating-cowl upon the top of the soil-pipe itself, and providing an inlet of air to the soil-pipe, just above the trap, or in the upper part of the trap itself.

Figure 1 of the drawing shows a diagram sectional view of a dwelling, with the soil-pipe trapped and ventilated in the manner first above described, and Fig. 2 shows a similar view of the modified arrangement.

The same letters of reference indicate similar parts in both figures wherever they occur.

A is the soil-pipe, passing from top to bottom of the dwelling. B is a ventilating-cowl. In Fig. 1 the cowl is placed on the top of a ventilating-pipe, C, connected to the soil-pipe A just above the trap D. In this case the top of the soil-pipe is open to form an air-inlet, as above mentioned, and to receive rain-water from the roof. In Fig. 2 the cowl B is placed on the soil-pipe itself, and the air-inlet is through a pipe, E, which enters the soil-pipe A, just above the trap D, as shown.

The cowl is preferably constructed as shown in Fig. 3, and more particularly described in another application for Letters Patent in the United States, filed by me of this same date, but any other form of cowl to act in the same way may be used.

The trap D at the bottom of the soil-pipe may be of any suitable kind. It may, for example, be constructed as hereinafter described and shown in Figs. 1, 4, and 5; or it may be constructed as shown in Fig. 2, and fully described in another application for Letters Patent in the United States, filed by me of this same date.

From the above description it will be seen that (whichever arrangement of pipes may be used) a current of fresh air will flow into the soil-pipe at the inlet, and be drawn up to, and discharged through, the ventilating-cowl B, while, at the same time, the communication between the soil-pipe and the drain, cess-pool, or sewer is cut off by the valve or water-seal of the trap D. It will, consequently, be unnecessary to provide the several closets with a separate trap below the pan-trap of the basins. F F are the basins, pans, or valves of water-closets, which may be of any ordinary construction, except that they require no trap below them, and G is the outlet-drain, passing from the trap D to the sewer.

I have shown the two above-described modifications, as both will answer well, but I prefer the trap shown in Fig. 2, and the arrangement of pipes shown in Fig. 1, as in the latter the current of air in the soil-pipe passes in the same direction as the water descending through the said pipe, and the inlet and outlet for air are both above the top of the house.

In Fig. 2 I have also shown that a ventilating-pipe, I, (represented by dotted lines,) may be carried up from the drain G, leading to the cess-pool or sewer to the top of the dwelling, and be similarly acted on by the ventilating-cowl B. In this case the ordinary air-gratings in the drain or sewer will afford a sufficient inlet of fresh air, and a continuous current will be maintained through the drain and the pipe I, in the same way as through the soil-pipe A.

The ventilating-cowl I prefer to employ is fully described in my other application for Letters Patent above referred to, and is represented in central vertical section at Fig. 3. K is a horizontal cylinder, with a funnel-mouth, K', at one end. L is a short tube, rising up within the funnel, and bent round to bring it parallel and concentric with the cylinder K, in which it is carried along for a short distance, as shown, in order to cause a stream of air entering the funnel K' to travel forward in a straight course before it arrives at the end of the tube L. M is a spindle fixed to the funnel K' and tube L, and passing downward through the center of this tube. The spindle M is received within a supporting-tube, N, and rests upon a bearing at its lower end. The supporting-tube N is carried by arms from the sides of a short tube, O, placed at the top of the pipe to be ventilated.

Figs. 4 and 5 show on a larger scale the trap shown in Fig. 1, Fig. 5 showing also the application of the system of ventilation to the drain which connects the soil-pipe with the cesspool or sewer. Fig. 5 shows an elevation of the trap with the cover-plate removed, and Fig. 4 shows the cover-plate separately.

The trap is constructed with two dip-traps, the upper one, $D^1$, discharging into the lower one, $D^2$, and with an air-shaft, I', (used in lieu of the air-shaft I, shown in dotted lines, Fig. 2,) led up from the outlet O, into which the second trap discharges, and carried to the top of the house, where it is surmounted by a ventilating-cowl, by which a continuous upward current is maintained through it from the drain G, leading to the cess-pool and sewer, a proper inlet for fresh air being provided, as at P, which may be the grating over an open trap, and a trap at R, between the fresh-air inlet P and the cess-pool or sewer. The drain, cess-pool, or sewer is thus ventilated at the same time that any backward pressure is prevented coming upon the traps. The soil-pipe A is also carried up to the top of the house, and led either in the same ventilating-cowl as the air-shaft, as shown in Fig. 2, or the air-shaft and soil-pipe may each have separate ventilating-cowls. The soil-pipe has an inlet, E, for fresh air, led either into the trap itself, or, preferably, into the soil-pipe just above it, as shown.

Y Y are openings in the side cover-plate, closed by plates of glass, which allow of the condition of the traps being seen at all times. Instead of the two traps $D^1$ and $D^2$ being placed vertically one above the other, as shown in the drawings, they might be placed obliquely or otherwise.

Having thus described my invention, what I claim as new is—

1. The combination, with the soil-pipe having trap, of the exhaust-cowl placed on top of pipe, and the air-pipe just above trap, as and for the purpose set forth.

2. A ventilating-trap, consisting of two dip-traps, $D^1$ $D^2$, and an air-shaft, I, arranged substantially as and for the purpose specified.

The above specification of my invention signed by me this 21st day of July, 1876.

EDWARD GREGSON BANNER.

Witnesses:
WILMER M. HARRIS,
JOHN DEAN,
*Both of No.* 17 *Gracechurch street,*
*London, E. C.*